Oct. 7, 1958   C. W. HOOVER, JR., ET AL   2,855,540
BEAM POSITIONING SYSTEM
Filed April 27, 1956   2 Sheets-Sheet 1
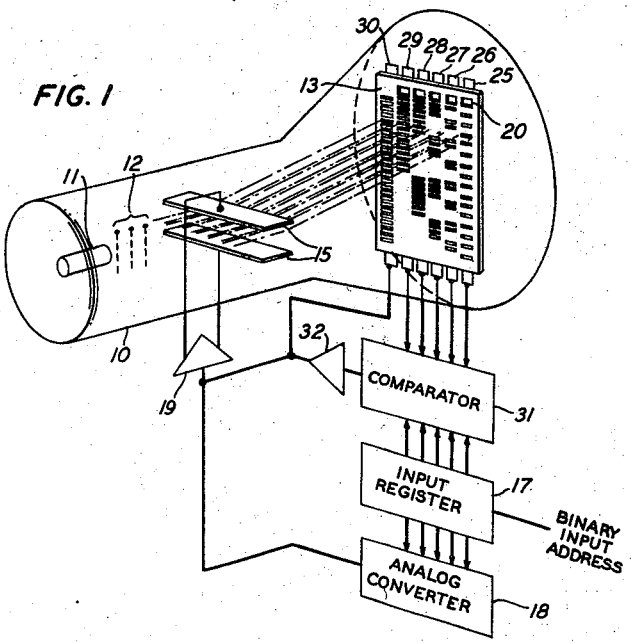
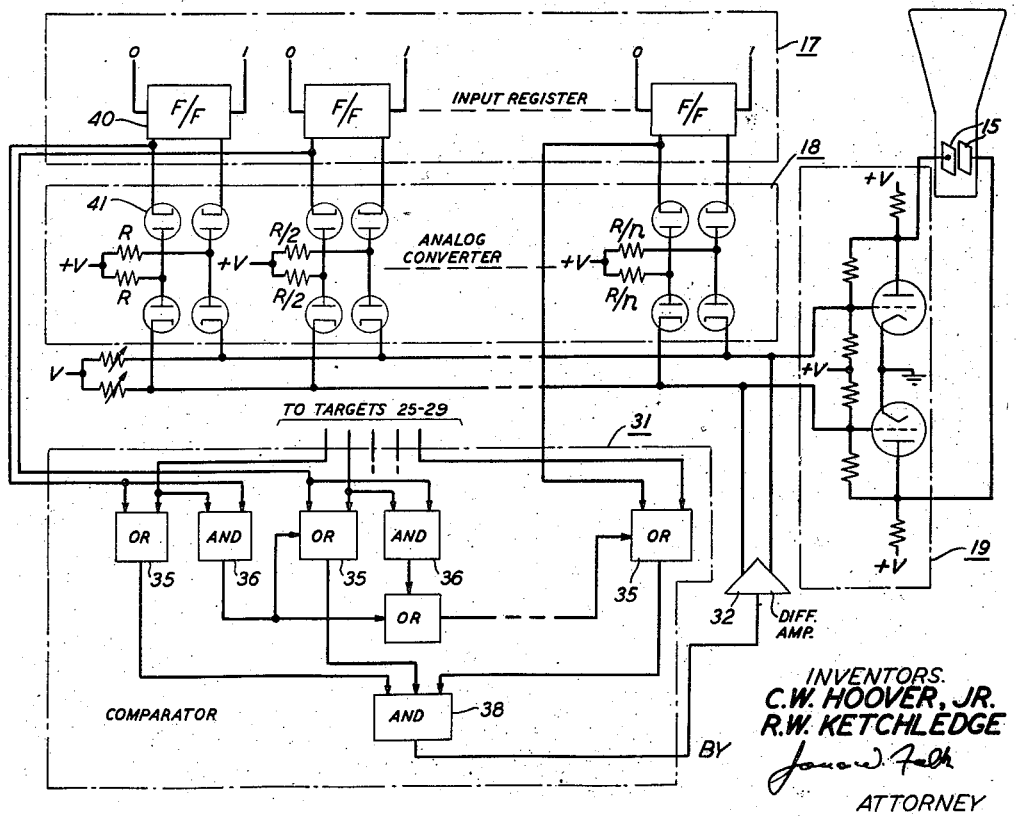
INVENTORS
C. W. HOOVER, JR.
R. W. KETCHLEDGE
BY
ATTORNEY Oct. 7, 1958    C. W. HOOVER, JR., ET AL    2,855,540
BEAM POSITIONING SYSTEM
Filed April 27, 1956    2 Sheets-Sheet 2

INVENTORS.
C. W. HOOVER, JR.
R. W. KETCHLEDGE
BY
*James J. Falk*

ATTORNEY

2,855,540

Patented Oct. 7, 1958

2,855,540
BEAM POSITIONING SYSTEM

Charles W. Hoover, Jr., Summit, and Raymond W. Ketchledge, Whippany, N. J., assignors to Bell Telephone Laboratories, Incorporated, New York, N. Y., a corporation of New York Application April 27, 1956, Serial No. 581,073

16 Claims. (Cl. 315—8.5)

This invention relates to electron discharge apparatus and more particularly to cathode ray devices comprising a plurality of target elements.

For various beam positioning applications, notably in information storage systems, a factor vital to satisfactory operation is rapid and accurate positioning of the cathode ray tube beam on the precise area of the storage surface from which information is to be derived or at which information is to be stored.

The positioning system which will comply with these exacting requirements and maintain a high performance standard over long periods must necessarily comprise a minimum of active elements subject to wear and consequent variation.

In order to appreciate more fully the requirements of such a positioning system, a storage system utilizing a barrier grid storage tube as described in R. W. Sears Patent 2,675,499, issued April 13, 1954, provides for upwards of 15,000 discrete information bearing areas on a relatively small storage surface, any one of which areas is to be selected by coordinate deflection of an electron beam in a matter of microseconds and the information located thereat read out.

Initial positioning of the beam to achieve the precise coordinate deflections required in such a system places a severe strain on positioning equipment involving the conventional digital to analog conversion and direct current amplification of input signals to the deflection plates.

It is therefore an object of this invention to provide an improved beam positioning system and more specifically, a beam positioning system which is independent of voltage variations due to instability and aging of active components.

Another object of this invention is to facilitate the production of a potential of any one of a plurality of precisely accurate magnitudes between a pair of terminal points, such as, for example, a pair of deflection plates of a cathode ray device.

Another object of this invention is to achieve accurately reproducible electron beam deflections in one or more cathode ray devices.

A further object of this invention is to facilitate the realization of such accurately reproducible beam deflections.

In one illustrative embodiment of this invention, a cathode ray device comprises an electron gun, beam forming and focusing elements for forming a flat beam of electrons and focusing them in a narrow line upon an aperture plate, a plurality of targets positioned to receive portions of the beam passing through the aperture plate, a deflection system to deflect the beam over the aperture plate, and means for comparing input signals to the deflection system with output signals from the targets and applying the resultant to the deflection system.

In one construction the apertures in the aperture plate are arranged in rows and columns, each row forming a number in the binary number system or code. Each of the plurality of targets is positioned to receive any of the electron beam which may pass through apertures in a corresponding column of the aperture plate. The simultaneous output of the targets in parallel thus forms a binary number which is compared with input signals to the system also in parallel binary form. The resultant signal is fed to the deflection system where it adjusts the deflecting voltage automatically until input and output numbers agree, at which point the beam is held in a position corresponding to the input number. Thus each beam position corresponds to a precisely adjusted or final deflecting voltage, and any one of a plurality of preassigned potentials may be accurately produced across the deflection system by the application of a corresponding voltage to the deflection system. In addition the positional accuracy is dependent upon the accuracy of a passive element, the coding aperture plate.

In accordance with one feature of this invention, the deflection system is energized selectively by analog values of groups of input pulses in a particular number system, which input pulses are applied also to a logic circuit in parallel form.

Another feature of this invention relates to a plurality of targets feeding signals to a logic circuit in parallel form, which signals are representative of the position of an electron beam on the targets.

Another feature of this invention relates to the application to the deflection system of an electron discharge device of the resultant signal produced by comparison of the device input and output signals to deflect the beam until the input and output signals agree.

The potentials produced across the deflection system may be utilized to control the beam deflection in one or more cathode ray devices. Two devices constructed in accordance with this invention may be utilized to produce coordinate deflecting potentials for one or more cathode ray devices.

A complete understanding of this invention and of the above-noted and other features thereof may be gained from consideration of the following detailed description and the accompanying drawing in which:

Fig. 1 is a simplified diagram showing the components and relation thereof of a cathode ray device and associated circuitry illustrative of one embodiment of this invention;

Fig. 2 is a schematic representation, mainly in block diagram form, of one specific embodiment of this invention in accordance with Fig. 1;

Figure 3:
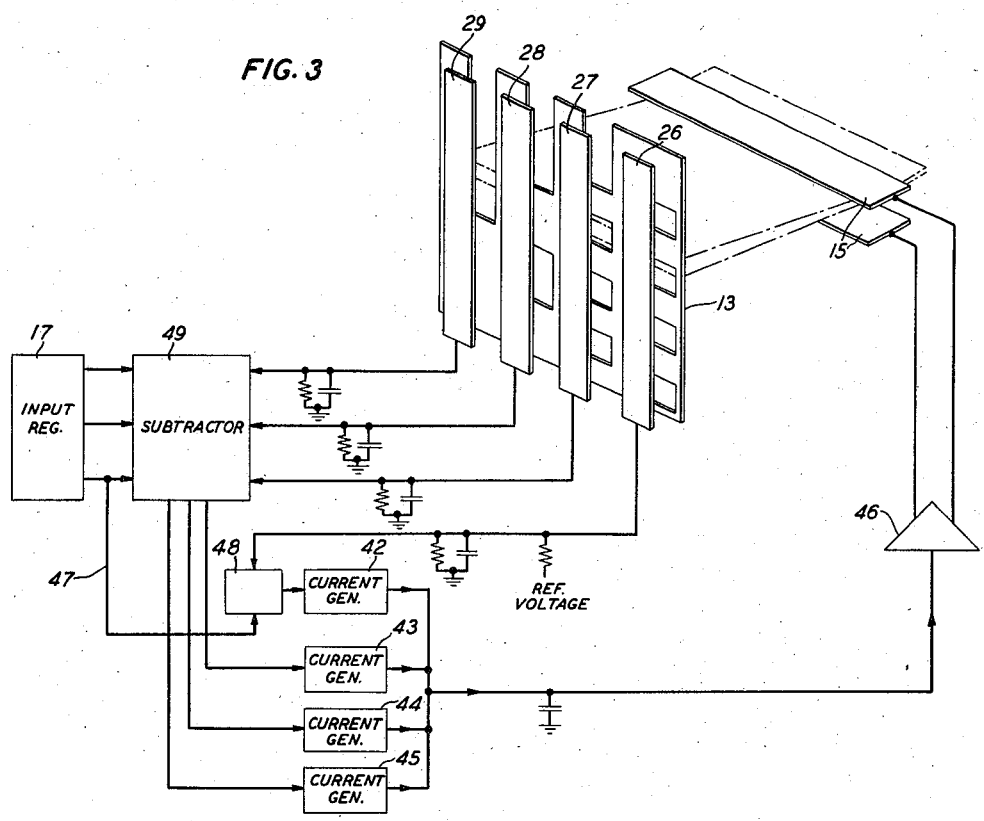
Fig. 3 is a schematic representation, mainly in block diagram form of another specific illustrative embodiment of this invention in accordance with Fig. 1.

Referring now to the drawing, Fig. 1 is a schematic diagram, mainly in block form, of one specific illustrative embodiment of a positioning system in accordance with this invention. As there depicted, the system contains a cathode ray device comprising an evacuated enclosing vessel 10 at one end of which is mounted an electron gun 11 for provision of a suitable source of electrons. Beam forming elements 12, positioned in the path of the electron beam from the gun 11, may be of any desired or suitable number and configuration and may be equipped with apertures in the form of slits so as to function in a manner analogous to cylindrical lenses and to present a wide, flat and very thin beam or plane of electrons to the plate 13. The beam forming elements 12 may be connected to any suitable sources of accelerating and beam forming and focusing potentials to provide such a beam configuration and may be electrostatic, electromagnetic, or a combination of both types of electron control means.

Plate 13 is provided with a plurality of apertures arranged in columns and rows as shown in the drawing. In accordance with this specific illustrative embodiment, the apertures in plate 13 are arranged to form the desired code on targets 25—29 when the beam impinges upon the plate 13 in different positions, a target 30 being provided for quantizing purposes. Plate 13, as shown in the drawing, is arranged to form code groups in accordance with the binary number system and specifically, in this illustrative embodiment, in the conventional binary number code. Individual targets 25—30 are positioned beyond plate 13 in such a manner that each of targets 25—30 corresponds to and receives portions of the electron beam passing through apertures in a column of the plate 13.

Deflection plates 15 are arranged to deflect the electron beam to any one of the aperture rows of plate 13 in accordance with the potential applied between plates 15. An input address comprising, in this specific illustrative embodiment, groups of signals representing digits of a conventional binary number code, are applied in parallel form to an input register 17. Each signal in the group of input signals is converted into an analog representation of a binary digit in the analog converter 18 and the summation of the analog representations is amplified by summing amplifier 19 and applied to deflection plates 15, thus providing discrete potentials between the deflection plates 15 representative of each code group of input signals. Each discrete potential applied between deflection plates 15 is intended to deflect the electron beam so as to impinge upon a corresponding row of apertures in the plate 13.

As shown in Fig. 1, the aperture plate 13 is arranged to form code groups of signaling conditions in accordance with a binary number system. The first column of apertures 20 represents one digit in each binary code group arranged in rows across the apertured plate 13. Target 25 is positioned to receive portions of the electron beam passing through column 20.

In the specific illustrative embodiment described herein the apertured plate 13 is arranged to provide code groups of five different signals, one signal of each group being formed in the respective apertured columns such as 20. These signals may be either one of two different signaling conditions. The invention is not limited to code groups of five different signals but may employ code groups of any number of signals. The two signaling conditions as reflected by the targets 25—30 are called signals of current and no current; other times they are referred to as signals of positive polarity and negative polarity, or in the binary number system as "one" and "zero." Thus a portion of the beam passing through an aperture in a column of the aperture plate 13 forms a "current" or "one" signal on the corresponding target. If the beam impinges upon the aperture plate 13 so as to be intercepted by the plate 13 in a particular column, the target corresponding to that column will register a "no current" or "zero" signal. Target 30 and the corresponding column of the aperture plate 13 are provided for quantizing, which operation is described in connection with Fig. 3.

Collectively the targets 25—29 provide output signals representing the digits of a binary number as established by the beam impinging a particular row of the aperture plate 13. These output signals are fed in parallel form to separate inputs of comparator 31. The binary signals emanating from the input register 17 are also fed in parallel form to other inputs of comparator 31.

The comparator 31 may be of the type described in an application of R. W. Ketchledge, Serial No. 581,175, filed April 27, 1956, and described in some detail herein in connection with Fig. 2. The resultant of the comparisons of binary signals from the input register 17 and the targets 25—29 in the comparator 31 is either one of two signal outputs from the comparator 31 amplified by the deflection amplifier 32 and applied to summing amplifier 19. For each group of binary input signals at the input register 17, there is a corresponding group of binary output signals from the targets 25—29 formed by the beam impinging upon a proper corresponding row of the aperture plate 13.

As shown in Fig. 1, the electron beam is focused in a horizontal line across the aperture plate 13 and deflected vertically, that is, at right angles to the line of the beam under control of the applied signals. Thus the magnitude of the analog representation of the group of binary input signals applied to the deflection plates 15 will determine the position on the aperture plate 13 that the line of the beam will assume.

Should the electron beam be improperly positioned, the group of binary signals formed at the targets 25—29 will represent a binary number which is greater or less than the binary number formed by the group of binary input signals. The output of the comparator 31 will be one signal if the input address number is larger than the target output number and the other signal if the reverse is true. Thus the comparator output applied to the summing amplifier 19 serves to alter the potential between the deflection plates 15 and to drive the beam in a proper direction to achieve a correspondence between the input address number and the target output number. Correspondence is evidenced by a transition from one comparison condition to the other at which point the servo will be locked to the beam position then evident, which position will properly represent the input binary number. For example, we will assume that the initial position of the beam is incorrect so that the beam impinges upon the aperture plate above the position designated by the group of binary input address signals. We will also assume that the target output signals due to this improper beam position form a binary number greater than the binary input address number and that the comparison of the two numbers in the comparator 31 results in an output signal serving to drive the beam down toward the proper position. The aperture plate 13 is so arranged that the target output numbers derived from beam positions above the proper position will be larger than the input address number and the comparison resultant signal in turn will continue to be such as to drive the beam downward until the proper position is reached and the input address and target output numbers correspond. A further downward movement of the beam will produce a target output number which is less than the input address number, and the comparison resultant signal will be reversed so as to drive the beam upward. Thus the beam will lock to the transition position which is the precise desired beam position for the particular input address.

The input register 17, analog converter 18 and logic comparator 31 used in this specific illustrative embodiment are shown in more detail in Fig. 2. The input register 17 and its associated analog converter 18 may be of any of a number of circuits capable of generating analog representations on application thereto of simultaneous input pulses; for example, as best shown in Fig. 2, input register 17 may comprise a series of bistable flip-flop units such as 40 arranged to feed simultaneously through diodes such as 41 of analog converter 18, which is capable of passing analog stepped amounts of current to summing amplifier 19. The outputs of flip-flop units 40 also are connected as shown in Fig. 2 to corresponding logical Or gates 35 and logical And gates 36 of comparator 31. Signals from the input register 17 are inverted before entering the respective Or gates and And gates so as to prevent the complement of the input address number thereto. The targets 25—29 are connected to other inputs of Or gates 35 and And gates 36, as shown in Fig. 2.

The comparator 31, as shown in Fig. 2, is arranged to compare two conventional binary code numbers and to define the polarity of the difference between them by one of two output signals. This arrangement may be varied to compare two reflected binary code numbers or two numbers each being arranged in a different binary code as described in the application of R. W. Ketchledge referred to hereinbefore. For the instant illustrative embodiment the aperture plate 13 has its rows of apertures arranged in the conventional binary code and the input address is also in the conventional binary code.

Thus each Or gate 35 and And gate 36 has a digit of the target output number and a complement of a digit of the input address number applied at its inputs. Each Or gate 35 will provide an output signal if one or both of its inputs are energized by signals representing the digit "one." Each And gate 36 will provide an output signal only if both of its inputs are energized by "one" signals. The logic is such that when the address input number is larger than the target output number, the inputs to And gate 38 will contain at least one "zero" signal, whereupon And gate 38 will provide an output signal serving to drive the electron beam in one direction. If the target output number is the larger of the two, all of the inputs to And gate 38 will contain "one" signals, whereupon And gate 38 will provide an output signal of such character as to drive the electron beam in the opposite direction. It is readily apparent that the comparator may be arranged to compare signals of the same or different code systems and that the aperture plate 13 can have its rows of apertures arranged in various manners compatible with the code system to be compared so as to permit a prompt positioning on any desired row of apertures in the aperture plate 13. Thus input signals may be in the conventional binary code, the reflected binary code, etc., and the aperture plate may be arranged in the code corresponding to the input signals or in a different code.

Other comparison schemes may be utilized in this system such as the use of a binary subtractor element to compare the input address number and the target output number digit by digit. In another specific embodiment as shown in Fig. 3, the input register 17 is connected directly to a subtractor 49. The electron beam is positioned initially in any appropriate quiescent state position. In this initial position the beam will set up signal currents on the targets such as 27—29 according to the row of apertures the beam impinges in the aperture plate 13. The targets are connected to inputs of the subtractor 49 such that each digit of the input address applied to input register 17 is compared with each corresponding digit of the target output number and individual output leads from the subtractor 49 reflect the results of the individual comparisons. The beam may be left in any position established by a previous positioning signal, and the target output number produced by this beam position may be compared with a new input address number in the subtractor 49 to reposition the beam.

The subtractor 49 may comprise an arrangement of tetrode tubes and gates forming a simple subtractor element for each pair of digits to be compared such that a signal of one polarity will result from the comparison of an input digit "1" from the input register 17 with an input digit "0" from the corresponding one of targets 27—29; a signal of opposite polarity will result from a reversal of the above inputs and no signal will be provided if the compared digits are alike. The outputs of the subtractor element are utilized to start or stop current generators such as 43—45, Fig. 3, with a weight proportional to the numerical weight of the digit column involved, the current generators being connected to the deflection plates through a deflection amplifier 46. Thus the most significant digit column, the column associated with target 29 in this instance, corresponds to current generator 45 which is arranged to produce an output signal of the greatest relative weight. Current generators corresponding to digit columns of lesser significance provide output signals of relatively less weight, the weight decreasing in proportion to the decreasing significance of the corresponding binary digit.

The signs of the output signals from the subtractor 49 control the direction of current flow throught the current generators such as 43—45. The deflection per unit time generated in such a system is linearly related to the difference between the required and existing deflections. Thus the electron beam will be driven from its normal rest position or from the position determined by the previous input address to the position determined by the present input address.

In this specific embodiment of our invention a quantizing column may be added to the aperture plate 13 for fine positioning. The output from a target 26, Fig. 3, positioned behind the quantizing column, is compared in an anticoincidence circuit 48 to the least significant digit of the input address transmitted to circuit 48 over lead 47 from the input register 17. The least significant digit may also be procured, for purposes of this comparison, from the target behind the column of aperture plate 13 representing the least significant digit. The anticoincidence circuit 48 may be any known arrangement of elements having two inputs and one output and operative to provide a first output condition upon receipt or like input signals and a second output condition upon receipt of diverse input signals. The first or second output condition is applied to current generator 42 to determine the direction of drive for fine positioning, the actual deflection of the beam being under the control of the error signal generated in the quantizing digit column. Quantizing in the above described manner positions the beam on the top or bottom edge of the quantizing digit aperture, in either of which positions the beam impinges the median of a binary code number row of the aperture plate 13.

Figure 4:
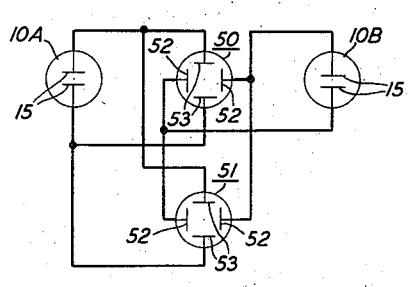
Fig. 4 is a diagram illustrating one manner in which devices as shown in Fig. 1 may be utilized to produce coordinate deflecting potentials for a plurality of cathode ray devices.

Arrangements in accordance with our invention, as illustrated in Figs. 1 and 3 are effective to produce signals at deflection plates 15 of prescribed magnitudes in response to signals applied to the input register 17. Such resultant signals may be utilized to effect accurately reproducible beam deflections in one or more cathode ray devices; for example, as illustrated in Fig. 4. In this figure, two devices 10A and 10B of the type shown in Fig. 1 or Fig. 3 and heretofore described serve to provide coordinate deflecting potentials for a series of cathode ray devices, such as devices 50 and 51 illustrated in Fig. 4, each having pairs of deflection plates 52 and 53 in space quadrature. The devices 50 and 51 may be any cathode ray device, but the arrangement in Fig. 4 is particularly useful in accurate positioning of tubes of the storage type such as the Barrier Grid tube, Dielectric Island tube and Flying Spot Store. The deflection plates 52 are connected in parallel with the deflection plates 15 of the device 10B; the plates 53 are similarly connected with respect to the plates 15 of the device 10A. Hence, the deflecting potential across any pair of deflection plates 52 or 53 will be the same as that across the respective deflection plates 15. With the voltages across the plates 15 accurately representative of signal voltages impressed upon either device 10A or 10B as pointed out above, accurately reproducible deflections of the beams in devices 50 and 51 may be obtained. For each pair of signals applied to the devices 10A and 10B, the beam in devices 50 and 51 will be deflected to a corresponding discrete position.

It will be appreciated that the deflection sensitivity of the coordinate tube 10 is entirely independent of variations in voltages due to aging of components, etc., and is governed in its accuracy solely by the accuracy of a mechanical member, the aperture plate 13. The servo control loop serves to constantly reposition the electron beam, keeping it locked to a particular position on the aperture plate and freeing the system from the severe restraints of accuracy and stability, including that on the accuracy of the accelerating voltage, encountered in previous systems of this general type.

It is to be understood that the above-described arrangements are illustrative of the application of the principles of this invention. Numerous other arrangements may be devised by those skilled in the art without departing from the spirit and scope of the invention.

What is claimed is:

1. A beam positioning system comprising a row of targets, means opposite said targets for projecting a beam toward said targets, a code plate intermediate said targets and said beam projecting means, said targets positioned to receive portions of said beam passing through said code plate, means for deflecting said beam along said plate, means for applying deflection signals to said deflection means, means connected between said last-mentioned means and said targets for comparing said deflection signals with signals from said targets, and means for applying signals resulting from said comparison to said deflection means for repositioning said beam.

2. A beam positioning system comprising a row of targets, means opposite said targets for forming and projecting a ribbon beam toward said targets, a code plate intermediate said targets and said beam projecting means, said plate having portions arranged in rows and columns through which portions said beam is transmitted and said beam impinging said plate in a line parallel to said rows, each target in said row of targets being positioned to receive portions of said beam passing through respective ones of said columns of code plate portions, means for deflecting said beam in a direction perpendicular to said line of impingement on said plate, means for applying deflection signals to said deflection means, means for comparing signals from said row of targets with said deflection signals, and means for applying the resultant of said comparison to said deflection means.

3. A beam positioning system in accordance with claim 2 wherein said means for applying deflection signals to said deflection means comprises an input register storing code groups of positioning signals and said means for comparing said deflection signals from said input register with signals from said row of targets is connected between said input register and said row of targets.

4. A beam positioning system in accordance with claim 2 wherein said means for applying deflection signals to said deflection means comprises amplifying means connected to said deflection means, input means storing a plurality of input signals, means connected between said input means and said amplifying means for deriving analog representations of said input signals and applying said representations to said amplifying means and wherein said means for comparing said input signals with signals from said row of targets is connected between said input means and said row of targets.

5. A beam positioning system in accordance with claim 3 wherein said means for applying the resultant of said comparison to said deflection means comprises a plurality of current generators, said comparing means applying the resultant of each signal comparison to a corresponding one of said current generators and amplifying means connected between said current generators and said deflection means, said current generators supplying different weighted amounts of current to said amplifying means in response to receipt of said signal comparison resultants therein.

6. A positioning system in accordance with claim 5 and further comprising quantizing means consisting of a supplemental column in said code plate and associated target means, supplemental comparing means connected between said associated target means and said input register, and means applying the resultant of the comparison in said supplemental comparing means to another of said plurality of current generators.

7. A beam positioning system comprising a plurality of targets, means for projecting a beam toward said targets, beam forming elements for forming said beam in a ribbonlike configuration, a coding plate having apertures arranged in a plurality of rows across said plate, each of said rows of apertures constituting a code number, said beam impinging said plate to form an intersecting line parallel to said rows of apertures and said targets being positioned to receive portions of said beam passing through respective apertures in each of said rows of apertures, means for deflecting said beam in a direction perpendicular to said intersecting line on said plate, an input register storing a code group of positioning signals, means connected between said input register and said target means for comparing said code group of positioning signals with signals from said target means, and means for applying the resultant of said comparison to said deflection means.

8. A beam positioning system comprising a plurality of targets, means for projecting a beam toward said targets, beam forming elements for forming said beam in a ribbonlike configuration, a coding plate having apertures arranged in a plurality of rows across said plate, each of said rows of apertures constituting a code number, said beam impinging said plate to form an intersecting line parallel to said rows of apertures and said targets being positioned to receive portions of said beam passing through respective apertures in each of said rows of apertures, means for deflecting said beam in a direction perpendicular to said intersecting line on said plate, an input register storing a plurality of input signals, means connected between said input register and said targets for comparing each of said plurality of input signals with corresponding signals from said targets, a plurality of current generators, means for applying the resultant of each of said signal comparisons to a corresponding one of said plurality of current generators and amplifying means connected between said current generators and said deflection means.

9. A beam positioning system comprising a plurality of targets, means for projecting a beam toward said targets, beam forming elements for forming said beam in a ribbonlike configuration, a coding plate having apertures arranged in a plurality of rows across said plate, each of said rows of apertures constituting a code number, said beam impinging said plate to form an intersecting line parallel to said rows of apertures, said targets being positioned to receive portions of said beam passing through respective apertures in each of said rows of apertures, means for deflecting said beam in a direction perpendicular to said intersecting line on said plate, an input register storing a plurality of input signals, a plurality of current generators, means connected between said input register and said targets for comparing each of said plurality of input signals with a corresponding one of a plurality of signals from said targets and applying the resultant of each of said comparisons to a corresponding one of said plurality of current generators and amplifying means connected between said current generators and said deflection means, said current generators supplying different weighted amounts of current to said amplifying means in response to receipt of said signal comparison resultants therein.

10. A beam positioning system comprising a plurality of targets, means for projecting a beam toward said targets, beam forming elements for forming said beam in a ribbonlike configuration, a coding plate having apertures arranged in a plurality of rows across said plate, each of said rows of apertures constituting a code number, said beam impinging said plate to form an intersecting line parallel to said rows of apertures, said targets being positioned to receive portions of said beam passing through respective apertures in each of said rows of apertures, means for deflecting said beam in a direction perpendicular to said intersecting line on said plate, an input register storing a code group of positioning signals, means for converting said code group of positioning signals to a representative deflection signal and for applying said deflection signal to said deflection means, means connected between said input register and said target means for comparing said code group of positioning signals with signals from said target means, and means for applying the resultant of said comparison to said deflection means.

11. A beam positioning system comprising a plurality of targets, means for projecting a beam toward said targets, beam forming elements for forming said beam in a ribbonlike configuration, a coding plate having apertures arranged in a plurality of rows across said plate, each of said rows of apertures constituting a code number, said beam impinging said plate to form an intersecting line parallel to said rows of apertures and said targets being positioned to receive portions of said beam passing through respective apertures in each of said rows of apertures, means for deflecting said beam in a direction perpendicular to said intersecting line on said plate, an input register storing a plurality of input signals, amplifying means connected to said deflection plates, means connected between said input register and said amplifying means for deriving analog representations of said input signals and applying said representations to said amplifying means, means connected between said input register and said targets for comparing said input signals with signals from said targets, and means for applying the resultant of said comparison to said amplifying means.

12. A beam positioning system comprising an electron discharge device, means for establishing a beam in said device, beam interception means having $2^n$ regions upon which said beam selectively impinges, $n$ being any integer, each of said regions comprising $n$ discrete areas having one of transmitting and intercepting characteristics, $n$ target means, each of said target means positioned to receive portions of said beam transmitted through a corresponding one of said discrete areas in each of said regions, whereby said target means are impinged upon by said beam to form $2^n$ coded output numbers corresponding to said $2^n$ regions, beam deflecting means, input means storing $n$ input signals representing one of $2^n$ code permutations, comparison means connected by $n$ circuits to said input means and by $n$ other circuits to said target means, said stored input signals being compared to said target output signals, and means applying the resultant of said comparison to said deflection means.

13. A beam positioning system comprising an electron discharge device, means for establishing a beam in said device, beam interception means having $2^n$ regions upon which said beam selectively impinges, $n$ being any integer, each of said regions comprising $n$ discrete areas having one of transmitting and intercepting characteristics, $n$ target means, each of said target means positioned to receive portions of said beam transmitted through a corresponding one of said discrete areas in each of said regions, whereby said target means are impinged upon by said beam to form $2^n$ coded output numbers corresponding to said $2^n$ regions, beam deflecting means, input means storing $n$ input signals representing one of $2^n$ code permutations, means connected between said input means and said target means for comparing each of said $n$ input signals with a corresponding digit signal of the $2^n$ coded output number then present at said target means, a plurality of current generators, means for applying the resultant of each of said signal comparisons to a corresponding one of said plurality of current generators, and amplifying means connected between said current generators and said deflection means, said current generators supplying different weighted amounts of current to said amplifying means in response to receipt of said signal comparison resultants therein.

14. A positioning system in accordance with claim 13 and further comprising quantizing means consisting of supplemental beam interception means and associated target means, supplemental comparing means connected between said associated target means and said input register and means for applying the resultant of the comparison in said supplemental comparing means to one of said plurality of current generators.

15. A beam positioning system comprising an electron discharge device, means for establishing a beam in said device, beam interception means having $2^n$ regions upon which said beam selectively impinges, $n$ being any integer, each of said regions comprising $n$ discrete areas having one of transmitting and intercepting characteristics, $n$ target means, each of said target means positioned to receive portions of said beam transmitted through a corresponding one of said discrete areas in each of said regions, whereby said target means are impinged upon by said beam to form $2_n$ coded output numbers corresponding to said $2^n$ regions, beam deflecting means, input means storing $n$ input signals representing one of $2^n$ code permutations, means for converting said stored input signals into a representative deflection signal and applying said deflection signal to said deflection means, comparison means connected by $n$ circuits to said input means and by $n$ other circuits to said target means, said stored input signals being compared to said target output signals, and means for applying the resultant of said comparison to said deflection means.

16. A beam positioning system comprising an electron discharge device, means for establishing a beam in said device, beam interception means having $2^n$ regions upon which said beam selectively impinges, $n$ being any integer, each of said regions comprising $n$ discrete areas having one of transmitting and intercepting characteristics, $n$ target means, each of said target means positioned to receive portions of said beam transmitted through a corresponding one of said discrete areas in each of said regions, whereby said target means are impinged upon by said beam to form $2^n$ coded output numbers corresponding to said $2^n$ regions, beam deflecting means, input means storing $n$ input signals representing one of $2^n$ code permutations, amplifying means connected to said deflection plates, means connected between said input means and said amplifying means for deriving analog representations of said input signals and applying said representations to said amplifying means, means connected between said input means and said target means for comparing each of said $n$ input signals with a corresponding digit signal of the $2^n$ coded output number then present at said target means and means for applying the resultant of said comparison to said amplifying means.

References Cited in the file of this patent

UNITED STATES PATENTS

| | | |
|---|---|---|
| 2,463,535 | Hecht | Mar. 8, 1949 |
| 2,616,060 | Goodall | Oct. 28, 1952 |
| 2,657,331 | Parker | Oct. 27, 1953 |
| 2,762,949 | Huffman | Sept. 11, 1956 |